Oct. 6, 1970 G. O. K. SCHNEIDER 3,532,828
MARKING OF ORIGINATING AND TERMINATION CALLS
Filed Nov. 22, 1967
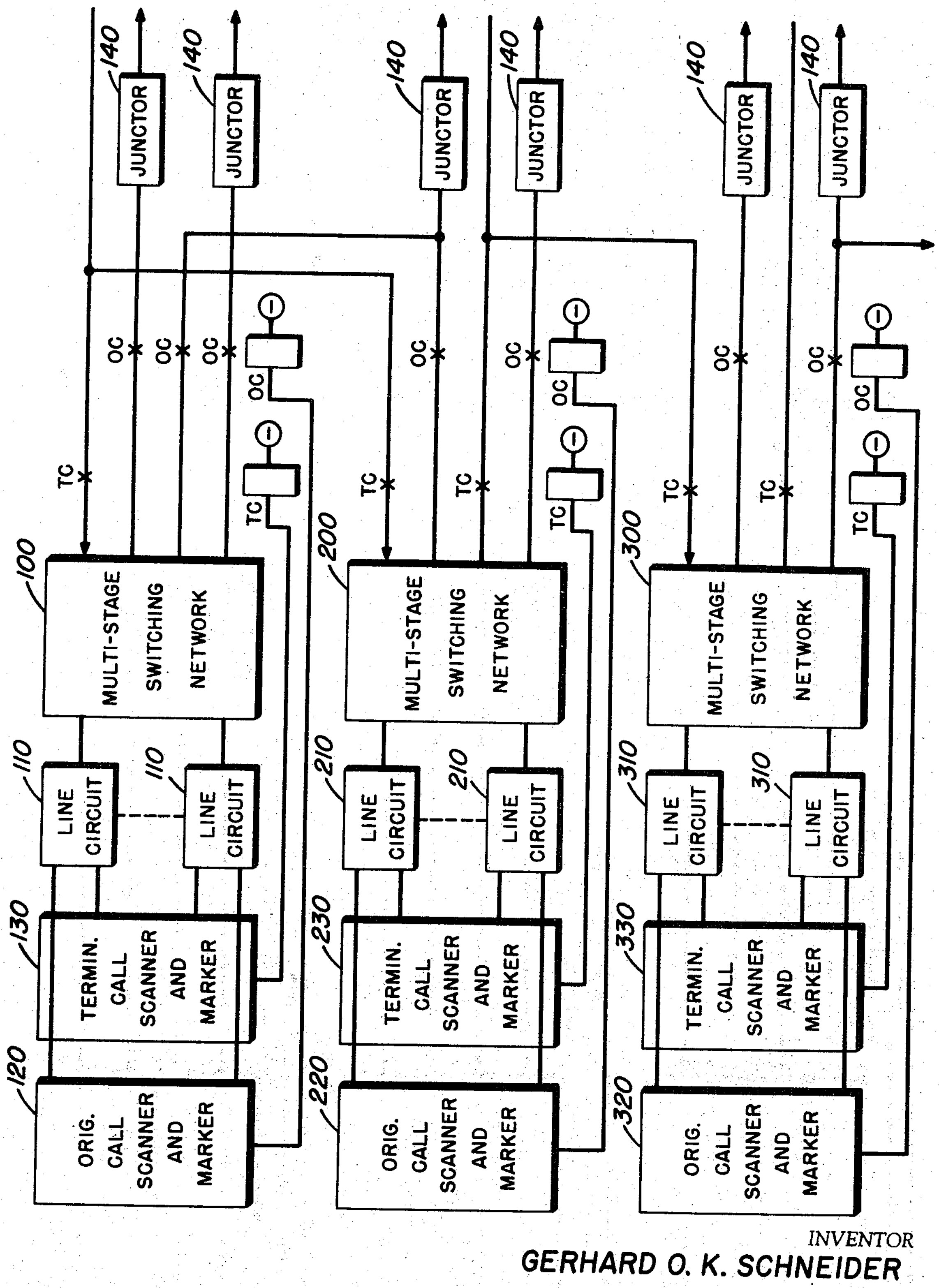
INVENTOR
GERHARD O. K. SCHNEIDER
BY Craig & Antonelli
ATTORNEYS United States Patent Office 3,532,828
Patented Oct. 6, 1970

3,532,828
MARKING OF ORIGINATING AND TERMINATION CALLS

Gerhard O. K. Schneider, Rochester, N.Y., assignor to Stromberg-Carlson Corporation, Rochester, N.Y., a corporation of Delaware Filed Nov. 22, 1967, Ser. No. 685,099
Int. Cl. H04q 3/42
U.S. Cl. 179—18 8 Claims

ABSTRACT OF THE DISCLOSURE

Marking control arrangement for telephone communication matrix switching system including originating and terminating scanning and marking arrangements for controlling establishment of originating and terminating communication connections through respective switching matrices wherein an originating call relay and a terminating call relay are provided for enabling either the connections to said network allocated to originating calls or the connections to said network allocated to terminating calls connections while inhibiting the other group of connections.

The present invention relates in general to communication systems and more particularly to a marking control arrangement for originating and terminating calls in a telephone communication matrix switching system.

In telephone exchanges utilizing step-by-step switching, there is little difficulty in setting up originating and terminating calls simultaneously. The split of the wiring or trunking into two communication directions occurs at the very beginning of operation, namely at the line circuits. However, in relay or other matrix switching systems, only one concentrator arrangement is provided, which serves both the purposes of line finding for originating calls and of line connecting for terminating calls. As a result, in the latter case, only one call can be set up at a time. It is normally impossible to set up an originating call and a terminating call simultaneously even if they are to be directed to different groups of line circuits. As a result, it is apparent that the speed in handling successive calls and the total amount of traffic which can be handled per unit time by a given exchange is seriously limited in known systems.

The present invention proposes a solution to the abovementioned problem by providing means for separately controlling the mark leads at the output of the switching matrix extending to originating calls as well as the mark leads at the output of the switching matrix extending to terminating calls. In this way, control over an originating or terminating call can be confined to a single line group of line circuits leaving the remaining line groups of the system free to handle another terminating or originating call. The result is faster operation because of the possibility of performing simultaneous marking of more than one call and a higher reliability because a failure in the terminating circuitry does not block the possibility of establishing originating calls, and vice versa.

In accordance with the present invention, relays are provided at the output of the last stage of the line link network for controling the mark leads forming part of originating and terminating communication connections. For each line group of line circuits, an originating call or relay is provided for enabling the mark leads extending to originating juncture line circuits and a terminating call relay is provided for enabling the mark leads which extend to terminating circuits, i.e., route selectors or terminating junctors. The originating and terminating call relays are controlled from individual originating and terminating call scanner and marker arrangements associated with the individual line circuits of the line group, so that upon marking of a line circuit for purposes of initiating an originating call, the marker will actuate the originating call relay associated with the line group, and will at the same time inhibit operation of the terminating call relay associated with this line group so as to prevent simultaneous establishment of a terminating call through the network associated with this line group. However, in any other line group originating or terminating calls can be established because the originating and terminating call relays of that group would be able to operate and close the mark leads which lead to the originating or terminating junctors. Since the networks of the respective line groups are separated, no confusion is possible between the terminating and originating calls in the individual groups. Thus, the marking of the originating call in one group cannot be detected by the terminating device of the other group because the contacts of the terminating call relay of the first group are open and the contacts of the originating call relay of the other group are open.

It is therefore an object of the present invention to provide a marking arrangement for originating and terminating calls which entirely eliminates or otherwise avoids the difficulties and disadvantages inherent in known systems of a similar nature.

It is another object of the present invention to provide a marking system for originating and terminating calls which make possible faster handling of calls.

It is a further object of the present invention to provide a marking arrangement for originating and terminating calls having a higher reliability than known arrangements due to the ability to handle both terminating and originating circuitry on an individual basis.

It is still another object of the present invention to provide a marking arrangement for originating and terminating calls which is capable of effecting simultaneous control over originating and terminating circuitry without resultant interference between line conections of separate line groups.

These and other objects, features and advantages of the present invention will become more apparent from the following detailed description of the invention, when taken in conjunction with the accompanying drawing, which illustrates one exemplary embodiment of the present invention, and wherein the sole figure is a schematic diagram of a line link network incorporating the features of the present invention.

Looking now more particularly to the drawing, the present invention is illustrated in combination with a typical line link network consisting of a single concentrator stage arranged in line groups of 1,000, 500, etc., line circuits depending upon the size of the telephone exchange. The details of the individual multi-stage switching networks forming the switching system for each line group and the details of the various line circuits, junctors and scanners associated with the switching network to form a typical line link network are sufficiently well known in the art that a detailed illustration and description thereof is believed unnecessary to a complete understanding of the principles of the present invention. Thus, the network circuitry associated with the present invention is illustrated only schematically and only such description as necessary to an understanding of the invention is provided hereinafter.

The exchange is typically divided into a plurality of line groups each provided with a multi-stage switching network, such as the networks 100, 200 and 300, provided in the drawing. To each of these switching networks is connected a plurality of line circuits 110, 210, and 310, respectively. The number of line circuits associated with each switching network depends upon the size of the telephone exchange and may typically consist of groups of 500 or 1,000 line circuits. While a particular group of line circuits is directly connected to each individual network, an interconnection of the output lines of the networks makes possible access from a line circuit to outputs of other networks, and vice versa.

For purposes of scanning the individual line circuits to determine requests for service in connection with originating calls, there is provided in each line group an originating call scanner and marker 120, 220 and 320, respectively, connected to each of the line circuits of the group. For purposes of scanning the line circuits to mark terminating line circuits, a terminating call scanner and marker 130, 230 and 330, respectively, is associated with the line circuits of each line group. For purposes of simplicity of description of the present invention, and simplicity in the illustration of the system embodying the present invention, only the mark leads MK of the typical 4-line communication channel are illustrated.

As in the typical line link network, a single multi-stage switching network in each line group serves both purposes of line finding for originating calls and of line connecting for terminating calls so that the outputs from the last stage of each switching network are connected to mark leads servicing terminating connections, for example, from a terminating junctor or route selector, and also mark leads connected to an originating junctor for serving originating communication connections from the line network.

In accordance with the present invention there is provided in association with each line group at the output of the multi-stage switching network thereof a terminating call relay TC having contacts TC in each mark lead serving a terminating connection to the switching network, and an originating call relay OC having contacts OC in each mark lead to the switching network serving originating calls. The terminating call relay TC is connected between negative potential and the terminating call scanner and marker 130, 230 or 330, and the originating call relay OC is connected between negative potential and the originating call scanner and marker 120, 220 or 320.

With provision of an originating call relay OC and a terminating call relay TC in each line group having contacts in the appropriate mark leads connected to the last stage of the multi-stage switching network therein, it is possible to simultaneously extend a terminating call through, for example, the multi-stage switching network 100 and an originating call through the multi-stage switching network 200 without resultant interference between the terminating and originating calls. If a terminating call is to be established to the first line group including multi-stage switching network 100, the terminating call relay TC associated with this line group is operated by the marker 130 at the same time that the line circuit 110 in the line group to which the call is to be directed is marked. At the same time, with operation of the terminating call relay TC, a condition is established wherein operation of the originating call relay OC associated with this line group is inhibited. This may occur either through interconnection of control circuitry between the terminating call scanner and marker 130 and the originating call scanner and marker 120 or by inclusion of contacts of the terminating call relay TC in the line to the originating call relay OC to open that line preventing operation of the relay from the scanner 120. Corresponding contacts of the originating call relay OC could also be provided in the line to the terminating call relay TC so as to prevent operation thereof from the terminating call scanner and marker 130 should the originating call relay OC be operated first.

With the terminating call relay TC in the first line group operated, terminating connections via the mark lead to the multi-stage switching network 100 are possible. It is noted at this point that while only a few paths are shown as connected to the last stage of each switching network, each of these paths represents multiple paths of a similar nature typically provided at the output of such switching stages. In accordance with the present invention each of the leads connected to the output of the multi-stage switching network would contain a contact of one of the relays TC or OC depending upon whether they are provided for serving terminating or originating calls, respectively.

With the originating call relay OC associated with the first line group inhibited from operation, the establishment of an originating connection from a line circuit 110 through the multi-stage switching network 100 is not possible until connection of the terminating call is completed through the switching network; however, only the mark leads leading to originating junctors of this first group remain open due to the condition of the originating call relay OC of the group. In any other line group an originating call can be established because the originating call relay OC of that group would not be inhibited. Thus, the originating call relay OC of the second line group may be operated via the originating call scanner and marker 220 to establish a connection from a line circuit 210 through the multi-stage switching network 200 to an originating junctor 140. During this operation, the terminating call relay TC of the second line group would be inhibited from operation so that the line group would be restricted to the establishment of an originating connection until the connection is finally complete.

It should be apparent from the foregoing description of the present invention that advantageously with the system described, a much faster handling of requests for service is possible because of the simultaneous response which may be provided in the individual line group to originating and terminating calls. This also provides for a higher reliability in the system because of a failure in the terminating circuitry in any line group does not block the possibility of establishing originating calls through the line group.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. A marking arrangement for originating and terminating calls in a telephone communication system having a plurality of line groups each including a multi-stage switching network, a plurality of line circuits connected to said switching network, an originating call scanner and marker and a terminating call scanner and marker connected to each of said line circuits for scanning and marking said line circuits for originating calls and terminating calls, respectively, a plurality of communication channels including a mark lead by which interconnection is made through said switching network to a selected line circuit, certain ones of said communication channels being allocated to originating calls and other ones being allocated to terminating calls, and control means for enabling either the channels allocated to originating calls or the channels allocated to terminating calls while inhibiting the other group of channels in response to establishment of a communication connection, the switching network of each line group being interconnected to provide access between a given line circuit and substantially any communication channel in the system.

2. The combination defined in claim 1 wherein said control means includes a first relay means associated with each originating call scanner and marker and having normally open contacts in each communication channel allocated to originating calls for enabling said originating channels in response to establishment of an originating communication connection through the switching network associated therewith.

3. The combination defined in claim 2 wherein said control means further includes a second relay means associated with each terminating call scanner and marker and having normally open contacts in each communication channel allocated to terminating calls for enabling said terminating channels in response to establishment of a terminating communication through the switching network associated therewith.

4. The combination defined in claim 3 wherein operation of one of said first and second relay means effects inhibiting of the other of said first and second relay means associated with a respective switching network.

5. A marking arrangement for originating and terminating calls in a telephone communication system having a plurality of line groups each including a multi-stage switching network, a plurality of line circuits connected to said switching network, a scanning means connected to each of said line circuits for scanning and marking said line circuits for originating calls and terminating calls, respectively, a plurality of communication channels including a mark lead by which interconnection is made through said switching network to a selected line circuit, certain ones of said communication channels being allocated to originating calls and other ones being allocated to terminating calls, and control means for enabling either the channels allocated to originating calls or the channels allocated to terminating calls while inhibiting the other group of channels in response to establishment of a communication connection, the switching network of each line group being interconnected to provide access between a given line circuit and substantially any communication channel in the system.

6. The combination defined in claim 5 wherein said control means includes a first relay means associated with each originating scanning means and having normally open contacts connected to the mark lead in each communication channel allocated to originating calls for enabling said originating channels in response to establishment of an originating communication connection through the switching network associated therewith.

7. The combination defined in claim 6 wherein said control means further includes a second relay means associated with each terminating scanning means and having normally open contacts connected to the mark lead in each communication channel allocated to terminating calls for enabling said terminating channels in response to establishment of a terminating communication through the switching network associated therewith.

8. The combination defined in claim 7 wherein operation of one of said first and second relay means effects inhibiting of the other of said first and second relay means associated with a respective switching network.

References Cited

UNITED STATES PATENTS

| | | | |
|---|---|---|---|
| 2,872,527 | 2/1959 | Bray et al. | 179—22 |
| 2,948,780 | 8/1960 | Bergmann et al. | 179—22 |
| 3,068,324 | 12/1962 | Warman | 179—22 |
| 3,248,485 | 4/1966 | Warman | 179—22 |
| 3,272,924 | 9/1966 | Warman | 179—22 |

KATHLEEN K. CLAFFY, Primary Examiner

R. P. MYERS, Assistant Examiner